P. K. DEDERICK.

Hay and Cotton Press.

No. 8,317. Reissued July 2, 1878.

WITNESSES

Francis L. Durand

W. C. Jordinston

INVENTOR

Peter K. Dederick

By Hill Ellsworth

His ATTORNEYS.

UNITED STATES PATENT OFFICE.

PETER K. DEDERICK, OF ALBANY, NEW YORK.

IMPROVEMENT IN HAY AND COTTON PRESSES.

Specification forming part of Letters Patent No. 132,566, dated October 29, 1872; Reissue No. 7,982, dated December 11, 1877; Reissue No. 8,317, dated July 2, 1878; application filed April 18, 1878.

DIVISION B.

*To all whom it may concern:*

Be it known that I, PETER K. DEDERICK, of the city of Albany, county of Albany, and State of New York, have invented certain new and useful Improvements in Baling-Presses; and I do hereby declare the following to be a full and exact description of the same, reference being had to the accompanying drawings, forming a part of this specification, in which—

Figure 1:
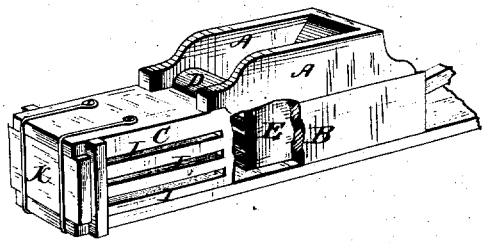
Figure 2:
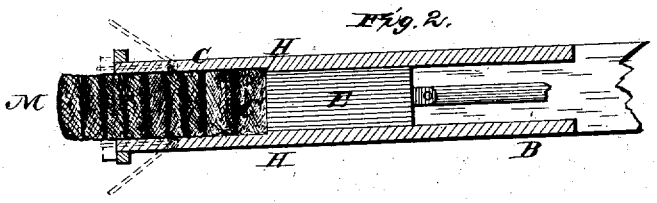
Figure 3:
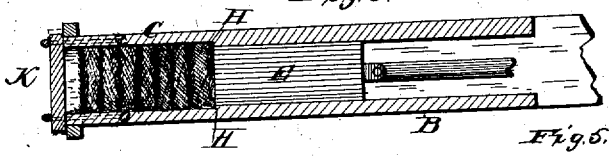
Figure 5:
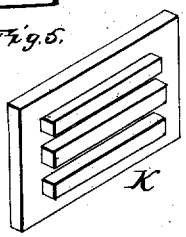
Figure 4:
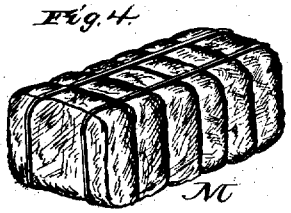

Figure 1 is a perspective view, showing the machine in position for operation. Fig. 2 is a horizontal section of the same, showing the operation of forming and ejecting the bale. Fig. 3 is a similar view with the end door closed, and showing a finished bale. Fig. 4 is a perspective view of the finished bale, and Fig. 5 is a perspective view of the end door.

In the figures, A is the hopper. B is the press-box, into which the loose material is received, the traverser meantime forming one of its vertical walls and the previously-deposited section the opposite vertical wall of the press-box. C is the bale-chamber, into which the material is deposited by the reciprocating traverser. M is a finished bale; C′, a forming bale. E is the reciprocating traverser, which plays or reciprocates through the press-box B, and is slotted in its face to admit of passing the ties in binding the bale. H are retaining-shoulders to prevent the hay from extending back with the traverser. K is an end door, provided with slots within the chamber, for passing the ties in binding the bale.

The power may be applied in a variety of ways. The bale, when formed in the bale-chamber C, is tied or bound through the slots I in the press-box, as shown in Fig. 1, and the slots in the traverser and head, and is removed or forced out of the end of the press at K.

The distance between end door K K of the press and the traverser E when nearest the door—or, in other words, the distance between the retainers that prevent the hay from expanding back and the door K—may be greater than the dimensions of the bale-chamber any other way, thus forming the length of the bale in line or toward the traverser or point of filling; and, as the expansion is always in the same direction toward the traverser or power, it will be proportionately less as the ends are smaller than the large sides of the bale, thus saving much of the expansion attending the ordinary form of bales when removed from the press.

If the chamber were fed from one of the larger sides by the reciprocating traverser, the expansive force of the hay would be so great that it could not well be retained when the traverser was withdrawn, but would expand back with it; but by feeding the charges or sections from the end or smaller side of the chamber or bale the amount of friction secured against the walls of the chamber is so much greater in proportion to the expanding or unsupported surface that but little else is required to retain or prevent the hay from expanding back when the traverser is withdrawn.

In operation, a quantity of hay or other material to be pressed is passed through the hopper A and received into the press-box B, and is then forced into the bale-chamber C by means of the traverser E, which is again withdrawn, its face forming one of the vertical walls of the press-box B, and the pressed material, or that forced into the chamber, forming the opposite vertical wall.

The operation is now repeated, and another charge in a like manner deposited in the chamber against the former one. This operation is continued, each successive stroke of the traverser forcing another charge within the chamber, and condensing the entire mass by just the amount of additional material forced within the bale-chamber beyond the stroke of the traverser, and the bale is thus compressed to any required solidity, and completed by means of additional charges of material forced within the limits of the chamber. The bale may now be tied off and removed or forced out of the end of the press. A similar operation to that described may then follow.

Additional sections are forced within the chamber against the bale, thus ejecting it at the opposite end of the chamber as fast as the sections for the forming bale are forced within it, the pressed material, in connection with the chamber, thus forming the necessary resistance within the chamber, and the finished bale gradually giving place to the forming bale within the chamber.

After the bale is ejected the material within the chamber is further compressed against the end door, which is replaced for this purpose, and the bale completed by forcing additional sections of material within the chamber until it is of the required solidity, as previously described.

Bales of hay or like material constructed in this manner possess many advantages over those now put upon the market, prominent among which are, first, their adaptability for storing or shipping. They must of necessity lie flat, and their angles adapt them to be closely packed without loss of space. They rest solidly and firmly upon each other, and can therefore be piled up without crowding out the walls of a building. Secondly, in feeding the hay, each layer, being pressed so that its edges form the sides of the bale, comes off of convenient size for a feed, and has not, therefore, to be divided for this purpose, as is the case with baled hay now in use.

Having thus fully described my invention, I claim—

1. The above-described method of forming a bale of hay, cotton, or other fibrous material by means of additional charges of material forced within a chamber, thus gradually compressing and completing the bale.

2. In a press for baling hay or other loose fibrous material, the oblong quadrilateral bale-chamber C, in combination with the press-box B and reciprocating traverser E, arranged at the end of said bale-chamber, whereby the bales are built up endwise, as set forth.

3. A procumbent or horizontal baling-press provided with a reciprocating traverser, E, and bale-chamber C, so constructed, combined, and operated that the pressed material and the face of the traverser constitute opposite vertical walls of the press-box B, as set forth.

4. A procumbent or horizontal baling-press provided with a reciprocating traverser, E, having tying-slots in its face for passing the ties for binding the bales, and in combination with the receiving-box B and bale-chamber C, for the purpose set forth.

5. The process of forming bales within the bale-chamber C by means of the previously compressed and finished bale M and the reciprocating traverser E, substantially as described.

6. In a baling-press in which the bales are pressed and ejected through the end, as set forth, the press-box B, reciprocating traverser E, and bale-chamber C.

7. In a baling-press in which the hay is pressed into bales within a procumbent or horizontal bale-chamber, as set forth, the press-box B, in combination with a reciprocating traverser, E, and bale-chamber C.

8. As a new article of manufacture, an oblong quadrilateral bale of hay, straw, or other loose fibrous material, built up in successive and separate compressed sections transversely of the bale, and bound together longitudinally of the bale, substantially as described.

P. K. DEDERICK.

Witnesses:

W. C. JIRDINSTON,

M. CHURCH.